UNITED STATES PATENT OFFICE.

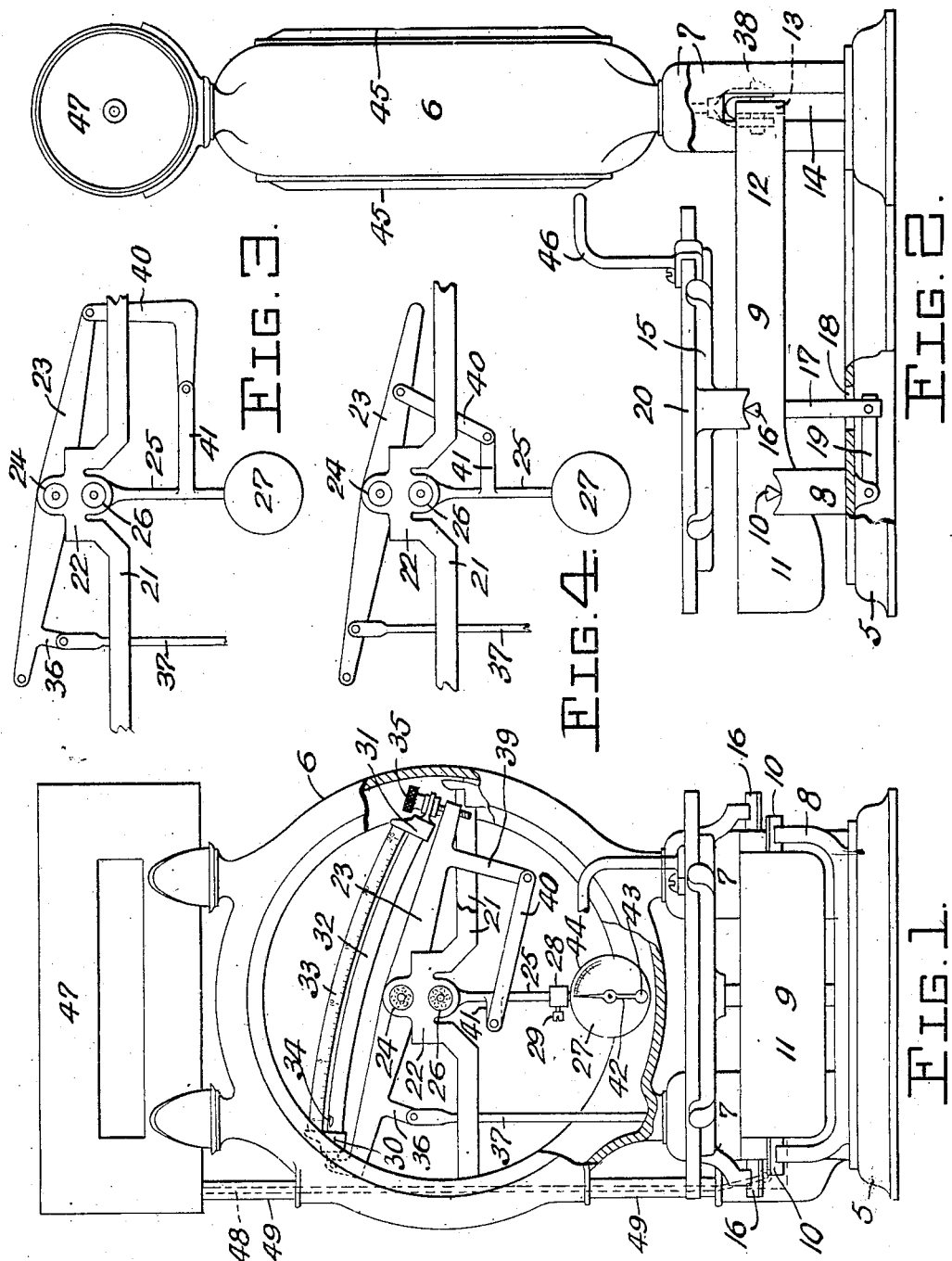

AVILA GAUVIN, OF MONTREAL, QUEBEC, CANADA.

AUTOMATIC WEIGHING-SCALE.

1,029,602.

Specification of Letters Patent. Patented June 18, 1912.

Application filed September 15, 1910. Serial No. 582,208.

*To all whom it may concern:*

Be it known that I, AVILA GAUVIN, of the city of Montreal, in the Province of Quebec and Dominion of Canada, have invented certain new and useful Improvements in Automatic Weighing-Scales, of which the following is a full, clear, and exact description.

This invention relates to improvements in automatic weighing scales, and the main object is to provide means whereby the scale will come quickly to a balance without the necessity of shifting the counterpoise.

A further object is to provide a weight indicating mechanism for the scale which cannot be tampered with.

To accomplish these objects I provide a framework carrying a suitably arranged depressible platform connected to a pivoted beam, which is in turn connected to a weighted pendulum lever, a curved glass tube having a bubble passing under a suitably graduated scale indicates the weight placed on the platform.

In the drawings which illustrate my invention:—Figure 1 is a front elevation of the device partly in section. Fig. 2 is a side elevation also partly in section. Fig. 3 shows an alternative form of connection between the scale beam and the pendulum lever. Fig. 4 shows a further alternative form of connection.

In the above defined figures, 5 designates a suitably shaped base, and 6 the inclosing case of the weighing mechanism, which is supported above the base by a pair of hollow legs 7. A yoke 8 is fixed to the front end of the base and pivotally supports the platform lever 9 by means of the bearings
10. This lever may be of any suitable shape and is provided at the front with a hollow portion 11 which may be loaded when assembling the scale.

The lever 9 is provided with a tail 12 having an arm 13 extending at an angle thereto, and entering one of the legs 7 through a slot 14 therein. The platform support 15 is pivotally mounted on the lever 9 by means of the bearing 16 located at each side thereof and to the rear of the bearings 10. This platform support is maintained in a horizontal position by means of a central post 17 depending therefrom and passing through an aperture 18 in the base
5. The lower end of the post is pivoted to one end of a link 19, the opposite end of which is pivoted to the base. This support 15 may be flat, as shown, and adapted to support the platform 20, or may be curved to support a scoop-pan, such as is used by grocers. The framework, consisting of two similar supports 21, is located diametrically across the case 6, and is raised at its center 22, where the beam 23 is supported by ball-bearings 24. The lever 25 is pivoted in ball-bearings 26 immediately below the ball-bearings 24, and depends to within a short distance of the bottom of the case 6. The lower extremity of the lever 25 is provided with a bob or weight 27, similar in shape to the bob of a clock pendulum. This weight 27 forms the counterpoise of the scale and is adapted to be swung like a pendulum when the weight is placed on the scale platform. Immediately above the weight 27, a small weight 28 is slidably mounted on a lever 25 and is provided with a set screw 29 to hold it at any desired point on the lever. At the ends of the beam 23 are caps 30 and 31 adapted to support between them a curved scale 33 located above the tube. The tube 32 contains a suitable liquid in which a small bubble 34 is left, such as is used in a spirit level, and this bubble moving in the tube 32 as the scale beam tilts, indicates on the scale 33 the weight of the article placed on the platform. The cap 30 is pivotally connected to the scale beam, while the cap 31 is mounted on the beam by means of set screws 35, so that the tube may be readily adjusted to the beam. One arm of the beam 23 is provided with a short depending finger 36, to which the upper end of a rod 37 is pivotally connected. The lower end of this rod is pivoted to the arm 13 of the platform lever 9, as shown at 38. The opposite arm of the beam 23 is also provided with a depending finger 39, the lower extremity of which is connected by a link 40 with a small lug 41 formed on the opposite side of the lever 25 from the finger 39. As a further means of indicating weights, I provide a small needle 42 pivoted to the center of the weight 27 and provided at one end with a weight 43. By reason of the action of gravity the needle 42 will always hang vertically the weight 43 being the lowest point. The opposite end of this needle is adapted to swing over the scale 44 formed on the weight 27 when the lever 25 and weight 26 move to one side.

In order to protect the mechanism within the case 6, I provide front and back cover plates 45 for the casing which are preferably made of thick glass. A suitable fender 46 may be attached to the platform to protect the glass cover from breakage or soiling.

In the alternative form shown in Fig. 3, the finger 39 of the beam is omitted, and the connecting link 40 is made L-shaped, the lug 41 of the lever 25 is lengthened and shifted to the side of the lever adjacent the link. In Fig. 4 the L-shaped link is replaced by a straight link and the finger 36 of the beam eliminated.

Any suitable cash computing and weight indicating device 47 may be mounted above the case 6 and operated by means of a rod 48, which passes down partly through guard tubes 49 and partly through the case 6, and is attached at its lower extremity to the arm 13 of the platform lever 9.

The operation of the device is simple, and it will be easily understood that articles placed on the platform 20 depress the same so that the lever 9 is also depressed to tilt the beam 23 through the medium of the rod 37. As the beam tilts, it moves the lever 25 to one side, thereby raising the weight 27. The finger 39 of the beam, allows the pull on the lever 25 to be in a substantially horizontal direction, the farther the lever 25 is swung to one side, the farther it raises the weight, and the farther the weight moves laterally, the greater the leverage it exerts, as will be readily seen from Fig. 1 of the drawings. As the scale beam tilts, the bubble 34 seeking the highest point of the curved tube 32 indicates on the scale 33 the weight on the platform.

Having thus described my invention, what I claim is:—

1. In a weighing scale, a scale beam, a platform, means connecting the scale beam and platform, a counterpoise, a lever suspending the counterpoise below the scale beam, an arm on said lever, a link connecting the extremity of said arm with the scale beam, and a small adjusting weight slidably mounted on the lever between the counterpoise and the lever arm.

2. In a weighing scale, a scale beam, a platform, means connecting the scale beam and platform, a circular counterpoise having a scale formed thereon, a needle pivoted on the counterpoise having one end thereof weighted and the opposite end thereof adapted to indicate weights on said scale, a lever suspending the counterpoise below the scale beam, an arm on said lever, a link connecting the extremity of said arm with the scale beam, and a small adjusting weight slidably mounted on the lever between the counterpoise and the lever arm.

In witness whereof I have hereunto set my hand in the presence of two witnesses.

AVILA GAUVIN.

Witnesses:
   STUART R. W. ALLEN,
   E. R. McKENZIE.